USO05712758A

United States Patent [19]
Amano et al.

[11] Patent Number: 5,712,758
[45] Date of Patent: Jan. 27, 1998

[54] MULTILAYER CERAMIC CHIP CAPACITOR AND A PROCESS FOR ITS MANUFACTURE

[75] Inventors: Koshi Amano; Kotaro Ogura, both of Fujiyoshida, Japan

[73] Assignee: Rohm Co., Ltd., Kyoto, Japan

[21] Appl. No.: 632,115

[22] Filed: Apr. 15, 1996

[30] Foreign Application Priority Data

Apr. 18, 1995 [JP] Japan ..................... 7-116507
Apr. 9, 1996 [JP] Japan ..................... 8-112075

[51] Int. Cl.⁶ ..................................... H01G 4/06
[52] U.S. Cl. .............. 361/321.2; 361/311; 361/313; 361/321.3; 361/321.4; 361/306.3; 361/308.1
[58] Field of Search .................... 361/311–313, 320, 361/321.1, 321.2, 321.3, 321.4, 321.5, 325, 328–330, 306.1, 306.3, 301.1, 301.2, 301.4, 303, 305, 308.1, 308.2, 308.3; 29/25.41, 25.42

[56] References Cited

U.S. PATENT DOCUMENTS

| 4,819,128 | 4/1989 | Florian et al. ................ 361/321 |
| 4,956,744 | 9/1990 | Berghout et al. ................ 361/321 |

FOREIGN PATENT DOCUMENTS 4-257211  9/1992  Japan .

*Primary Examiner*—Leo P. Picard
*Assistant Examiner*—Phuong T. Vu
*Attorney, Agent, or Firm*—Fay, Sharpe, Beall, Fagan, Minnich & McKee

[57] ABSTRACT

The multilayer ceramic chip capacitor includes a multilayer ceramic capacitor chip having internal electrodes and an external electrode that is formed of a sintered layer of a paste containing both an electroconductive metal powder and a glass frit on both end faces of the multilayer ceramic capacitor chip and having an electric connection to the internal electrodes. A coating of plated metal is deposited on the surface of the external electrode. The multilayer ceramic capacitor chip is chamfered to a radius of curvature (R) of 0.10 mm or more on the periphery of each of the end faces at which the internal electrodes are to be connected to the external electrode and/or the external electrode has a dual structure consisting of an undercoat in contact with the internal electrodes and a topcoat in superposition on the surface of the undercoat. The undercoat is being formed of a paste containing unmolten glass frit in an amount from 22 to 40 wt % of the electroconductive metal powder and the topcoat is formed of a paste containing unmolten glass frit in an amount from more than 0 to 7 wt % of the electroconductive metal powder. Both the topcoat and the undercoat are formed by sintering the applied pastes at temperatures that cause only the surfaces of the particles in the glass frit to melt. This capacitor and other types of ceramic multilayer chip electronic components manufactured by this inventive process have high resistance to cyclic thermal impacts.

4 Claims, 4 Drawing Sheets

MULTILAYER CERAMIC CHIP CAPACITOR AND A PROCESS FOR ITS MANUFACTURE

BACKGROUND OF THE INVENTION

This invention relates to a multilayer ceramic chip capacitor. More specifically, this invention relates to a multilayer ceramic chip capacitor that is less prone to cracking under the application of cyclic thermal impact.

In order to achieve high packing efficiency, electronic components such as capacitors, chip resistors and LSI packages are often mounted in a multilayer ceramic chip form in recent models of small electronic apparatus.

Conventional multilayer ceramic chip electronic components have their external electrodes formed of sintered bodies of a metal powder and a fused frit and, hence, they are rigid by themselves. When a conventional multilayer ceramic chip electronic component is soldered onto a circuit substrate, the latter deflects and stress will act on the electronic component via the external electrode and cracks are prone to develop in areas around the external electrode.

The external electrode, which is formed of a sintered body of a metallic material and a molten frit, has such high thermal conductivity that during soldering, the applied heat is transmitted not only to the external electrode but also to the adjacent internal electrodes (made of a metal) and the resulting thermal expansion mismatch from the less conductive multilayer ceramic part will occasionally destroy it or cause cracking.

With a view to solving these problems, it has been proposed in Unexamined Published Japanese Patent Application (kokai) Hei 4-257211 that mechanical and thermal cushion effects should be afforded to the external electrode in a multilayer ceramic chip electronic component, thereby ensuring against cracking in the latter. FIG. 9 is a partial fragmentary section of a multilayer ceramic chip electronic component manufactured by the proposed method. The electronic component shown in FIG. 9 has internal electrodes 110 that establish electric connection to a lead electrode 150 which, in turn, is covered with a cushion layer 160 made of an electroconductive paste. The cushion layer 160 has a plate 170 deposited on its outer surface to form an external electrode 140. The cushion layer 160 has such a cushion effect such that when the circuit substrate to which the electronic component is being soldered deflects, the propagation of the deforming stress to the electronic component is sufficiently damped to prevent its destruction. In addition, the cushion layer 160 provides such a thermal cushion effect that thermal conductivity is sufficiently reduced to damp the propagation of the soldering heat to the internal electrodes, thereby preventing the occurrence of thermally induced cracking at the interface between each internal electrode and the ceramic body. The plate 170 is formed of an inner Ni layer 180 and an outer Sn or Sn/Pb layer 190. Thus, the external electrode 140 on the chip electronic component shown in FIG. 9 is essentially composed of four layers.

The conventional multilayer ceramic chip electronic component shown in FIG. 9 is capable of preventing the permeance premeation of plating solutions and restraining the adsorption of hydrogen onto the internal electrodes and it can also withstand the thermal impact of soldering operations. Since the internal electrodes are made of Pd, hydrogen particles that are generated during electroplating are adsorbed on the internal electrodes and would then expand abruptly in service to thereby induce cracking. Hence, in order to prevent cracking, it is preferred that the adsorption of hydrogen is entirely eliminated. However, the conventional multilayer ceramic chip electronic component can withstand only several hundred cycles of thermal impact, each cycle consisting of heating to 125° C. and cooling to −55° C. and if it is subjected to more heat impact cycles, cracking and deteriorated insulation will occur. Hence, the conventional multilayer ceramic chip electronic component has not provided complete satisfaction for users who need higher levels of operational reliability.

SUMMARY OF THE INVENTION

An object, therefore, of the invention is to provide a multilayer ceramic chip capacitor having improved resistance to heat cycles.

This object of the invention can be attained by a multilayer ceramic chip capacitor comprising a multilayer ceramic capacitor chip having internal electrodes, an external electrode that is formed of a sintered layer of a paste containing both an electroconductive metal powder and a glass frit on both end faces of said multilayer ceramic capacitor chip and that has electric connection to said internal electrodes, and a coating of plated metal deposited on the surface of said external electrode, characterized in that said multilayer ceramic capacitor chip is chamfered to a radius of curvature (R) of 0.10 mm or more on the periphery of each of the end faces at which the internal electrodes are to be connected to the external electrode and/or that said external electrode has a dual structure consisting of an undercoat in contact with said internal electrodes and a topcoat in superposition on the surface of said undercoat, said undercoat being formed of a paste containing unmolten glass frit in an amount from 22 to 40 wt % of the electroconductive metal powder and said topcoat being formed of a paste containing unmolten glass frit in an amount from more than 0 to 7 wt % of the electroconductive metal powder, and both the topcoat and the undercoat being formed by sintering the applied pastes at temperatures that cause only the surfaces of the particles in said glass frit to melt.

Conventional capacitor chips are sometimes chamfered to R=0.03–0.08 mm and whereabouts at both electrode-forming end faces. The primary objective of this chamfering is to prevent feed jamming during the mounting operation and the radius of curvature for chamfering has not been specified to very close tolerances. It has been found, however, that if electrode-forming end faces of capacitor chips are chamfered to R=0.1 mm or above, preferably between 0.13 mm and 0.15 mm, the stress that is exerted upon the edge portions is sufficiently decentralized to provide higher resistance to thermal impact.

According to the second feature of the invention, unmolten glass frit is used to make an external electrode of a dual structure and the external electrode is formed by sintering at such temperatures that only the surfaces of the frit particles are melted whereas their interior is allowed to remain unmolten. The external electrode formed from the unmolten glass frit has a greater thermal shock absorbing capability than the conventional version made from molten glass frit. In addition, thermal expansion coefficient is adjusted to vary stepwise in the order of the dielectric material, the undercoat of the external electrode, the topcoat and the plated metal layers and this helps decentralize the thermal stress caused by thermal expansion. As a result, the multilayer ceramic chip capacitor of the invention is effectively protected against cracking under the impact of the heat generated at soldering temperatures, as well as against crack-induced deterioration in insulation. The capacitor is also protected against cracking under repeated application of thermal impacts, as well as against crack-induced deterioration in insulation.

Satisfactory improvements in the resistance to both soldering heat impact and cyclic thermal impact can be achieved either by chamfering the electrode-forming end faces or by adopting the external electrode of a dual structure. However, in order to attain better results in these aspects, it is preferred that chamfering and the formation of the external electrode with a dual structure be performed at the same time.

DETAILED DESCRIPTION OF THE DRAWINGS

The invention will now be described specifically with reference to accompanying drawings.

Figure 1:
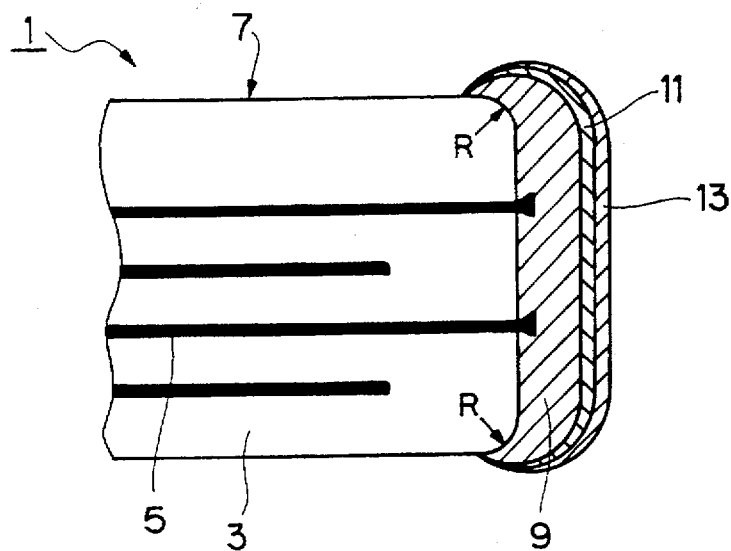
FIG. 1 is a partial fragmentary section of a multilayer ceramic chip capacitor as an example of the electronic component of the invention.

FIG. 1 is a partial fragmentary section of a multilayer ceramic chip capacitor as an example of the electronic component of the invention, in which chamfering is effected on the periphery of each of the end faces at which the internal electrodes are to be connected to the external electrode. As shown, the chip capacitor generally indicated by 1 comprises a multilayer ceramic capacitor chip 7 in which thin ceramic dielectric layers 3 alternate with internal electrodes 5 in a superposed relationship. Every other internal electrode 5 is connected to an external electrode (to be described below) on either side of the capacitor chip 7. The ceramic dielectric layers are typically made of a lead relaxer- or barium titanate-base dielectric or a titanium-base dielectric material. The internal electrodes 5 are typically made of noble metals such as palladium, platinum and silver-palladium alloys; they may also be made of base metals such as nickel. The ceramic dielectric layers each have a thickness of about several tens of micrometers and may be superposed in 20–100 layers or more. The external electrode 9 is electrically connected to an end of each internal electrode 5. The surface of the external electrode 9 is plated with a Ni layer 11 which, in turn, is plated with a solder (e.g. Sn or Sn—Pb) layer 13. The external electrode 9 in the multilayer ceramic chip capacitor shown in FIG. 1 may be formed of any materials that are conventionally used to make the external electrode.

The capacitor chip 7 is chamfered to a radius of curvature (R) of at least 0.10 mm, preferably 0.13 mm–0.15 mm, on the four sides of each of the end faces at which the internal electrodes are joined to the external electrode. At the four corners where the longer side crosses the shorter side, the radius of curvature may occasionally exceed the range of 0.13 mm–0.15 mm since the chamfering effect on the longer side adds to the chamfering effect on the shorter side. If the end faces at which the internal electrodes are joined to the external electrode are chamfered to $R \geq 0.10$ mm, the stress at the edges of the capacitor chip will be sufficiently decentralized to provide higher resistance to both soldering heat impact and cyclic thermal impact. Radii of curvature exceeding 0.15 mm may also be adopted; however, the effectiveness in improving the resistance to both soldering heat impact and cyclic thermal impact is saturated above $R=0.15$ mm, so providing radii of curvature in excess of 0.15 mm only adds to the processing cost and, hence, is uneconomical.

The multilayer ceramic capacitor chip per se can be fabricated by any method that is well known to the skilled artisan. The thus fabricated capacitor chip is charged into a suitable pot together with an abrasive which is a mixture of electrofused alumina and tungsten carbide powders. After it is filled with water or any suitable organic medium, the pot is revolved so that the internal electrodes in the chip will become exposed on the surface, thereby providing better contact with the external electrode while, at the same time, the four peripheral sides of the chip are chamfered at both end faces. The abrasive to be used is in no way limited to the mixture of electrofused alumina and carbide tungsten powders and any other suitable abrasives may be employed. The speed at which the pot is revolved and the time of its revolution may be determined by the skilled artisan as appropriate for the radius of curvature that need be provided for the peripheral sides of the capacitor chip at both end faces. A practical example is to perform a preliminary experiment for determining the rotating speeds and times that are associated with various values of radius of curvature and on the basis of these data, the skilled artisan can easily determine the processing conditions required for the manufacture of actual products.

Figure 2:
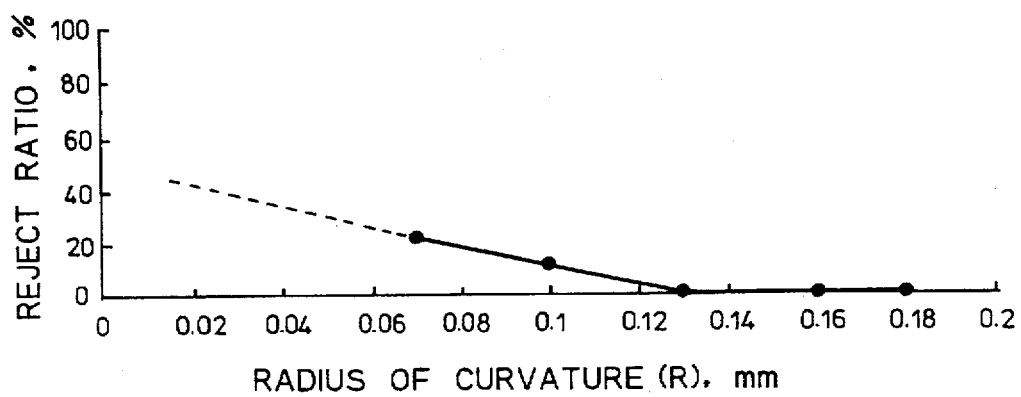
FIG. 2 is a graph showing the relationship between the curvature to which the end faces of a ceramic capacitor chip were chamfered and the reject ratio of the thus processed samples.

FIG. 2 is a graph demonstrating the effectiveness of chamfering the four sides of the multilayer ceramic capacitor chip at each of the end faces where the internal electrodes are joined to the external electrode. Samples of the processed capacitor chip were subjected to 300 cycles of thermal shock application, each cycle consisting of cooling to −55° C. and heating to 125° C. As shown, the reject ratio of the samples (due to cracking) was zero percent when the four sides of each end face were chamfered to R=0.13 mm and above.

Figure 3:
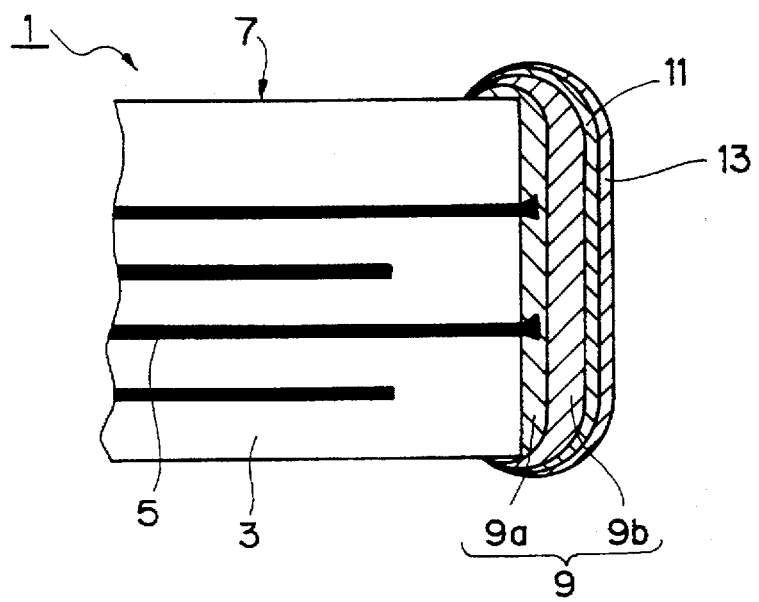
FIG. 3 is a partial fragmentary section of a multilayer ceramic chip capacitor as another example of the electronic component of the invention.

FIG. 3 is a partial fragmentary section of a multilayer ceramic chip capacitor as another example of the electronic component of the invention. As shown, the external electrode 9 joined to the end faces of the capacitor chip 7 consists of undercoat 9a and topcoat 9b. The undercoat 9a is typically formed from a paste that is prepared by mixing the powder of an electroconductive metal such as Ag, Pd, Pt or Cu with unmolten frit containing at least one of PbO, $SiO_2$, $Al_2O_3$, $B_2O_3$ and ZnO in an amount from 22 to 40 wt % (based on the weight of the inorganic components of the paste) and blending the resulting formulation with a vehicle consisting of ethyl cellulose and terpineol. The topcoat 9b is typically formed from a paste that is prepared by mixing the powder of an electroconductive metal such as Ag, Pd, Pt or Cu with unmolten frit containing at least one of PbO, $SiO_2$, $Al_2O_3$, $B_2O_3$ and ZnO in an amount from more than 0 to 7 wt % (based on the weight of the inorganic components of the paste) and blending the resulting formulation with a vehicle consisting of ethyl cellulose and terpineol.

Figure 4:
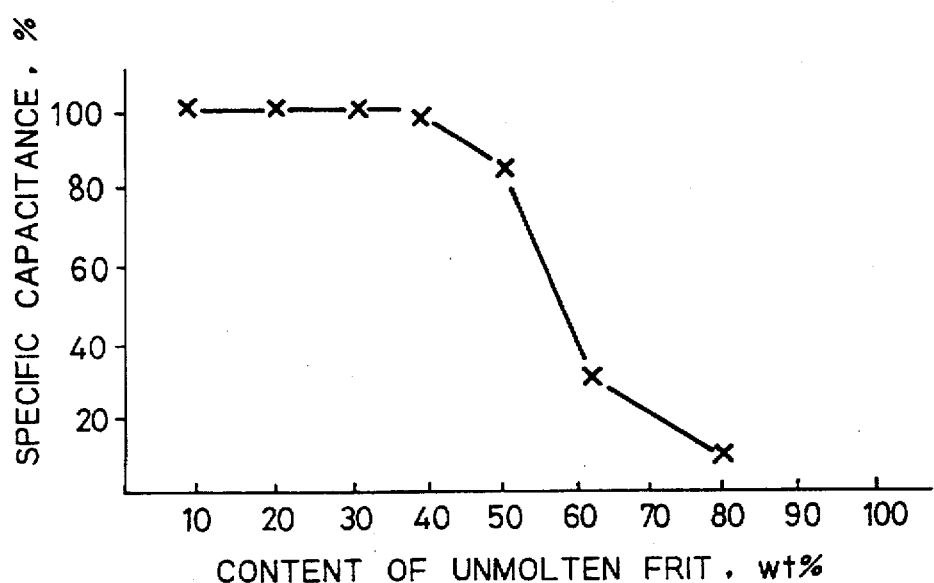
FIG. 4 is a graph showing the relationship between the content of unmolten frit in a paste for the undercoat of an external electrode and the specific capacitance of the chip.

FIG. 4 is a graph showing the relationship between the content of unmolten glass frit in the paste for the undercoat of the external electrode and the specific capacitance of the capacitor chip. As shown, the specific capacitance decreased sharply when the content of unmolten glass frit exceeded 40 wt %. The specific capacitance remained 100% even when the content of unmolten glass frit in the undercoat paste was less than 22 wt % but the desired effectiveness in improving the resistance to cyclic application of thermal shock was not attained. Therefore, the proportion of the unmolten glass frit in the undercoat paste is preferably in the range from 22 to 40 wt %.

On the other hand, if the content of the unmolten frit in the paste for the topcoat of the external electrode exceeds 7 wt %, the resulting topcoat is not highly compatible with subsequent plating or the plated metal will not have good adhesion. Even if the content of the unmolten frit in the topcoat paste is zero percent, the frit in the undercoat will diffuse after sintering and the topcoat of the external electrode in the final product contains a detectable amount of the yet to be molten frit. However, in order to ensure that a positive amount of the unmolten frit will occur, it is preferred that a certain amount of the unmolten glass frit is deliberately incorporated in the topcoat paste.

The sintered undercoat 9a has a thickness within the range from 5 to 20 μm whereas the sintered topcoat 9b has a thickness in the range from 20 to 100 μm, the topcoat being preferably thicker than the undercoat. The topcoat thicker than the undercoat is capable of effective absorption of an applied thermal stress. If the sintered undercoat 9a is thinner than 5 μm, the resulting external electrode will have only limited adhesion or deteriorated insulation will occur on account of the entrance of plating solutions. If, on the other hand, the thickness of the sintered undercoat 9a exceeds 20 μm, a disadvantage such as the failure to achieve 100% specific capacitance will occur. If the thickness of the topcoat 9b is less than 20 μm, 100% specific capacitance is not attained and a disadvantage such as low compatibility for plating will occur. If, on the other hand, the topcoat 9b is thicker than 100 μm, the intended effectiveness is saturated and only inefficiency will result.

The undercoat paste is diluted with a suitable solvent such as terpineol, diethylene glycol or butyl acetate, applied onto the end faces of the capacitor chip, and dried at 180°–230° C. for 8–15 min. Similarly, the topcoat paste is diluted with the suitable solvent mentioned above, applied onto the previously formed undercoat and dried. The thus applied undercoat and topcoat are then sintered by heating to a temperature of 600°–700° C. at a rate of 20° C./min and maintaining the temperature for 10–20 min. The sintered layers are thereafter left to cool to room temperature. Alternatively, the undercoat paste is applied and the resulting undercoat is dried and sintered. The sintered undercoat is then overlaid with the topcoat paste and the applied topcoat is dried and sintered. In this way, the desired external electrode can be formed. What is important to the alternative method is that the topcoat be sintered at a lower temperature than the undercoat. In either method, it is most important that the sintering temperatures should be such that only the surfaces of the particles in the unmolten frit are melted whereas their interior remains unmolten. Using unmolten frit and sintering it such that only the surfaces of the frit particles vitrify is effective not only in improving the soldering heat impact and cyclic thermal impact but also in preventing the permeance of plating solutions and the adsorption of hydrogen. If molten frit is used as in the prior art, the permeance of plating solutions and the adsorption of hydrogen can be prevented by employing an external electrode of a two-layered structure but, on the other hand, applied thermal shocks cannot be effectively absorbed.

Coatings of plated metals can be deposited on the surface of the sintered external electrode of a two-layered structure by any methods that are well known to the skilled artisan. Plating consists of the deposition of a Ni plate and a Sn or Sn—Pb solder plate in the order written. These plates may be deposited by either electroplating or electroless plating. The thickness of the plates is not limited to any particular value and ranges generally from 3 to 5 μm. An appropriate plate thickness can be selected from the range commonly adopted by the skilled artisan.

Figure 5:
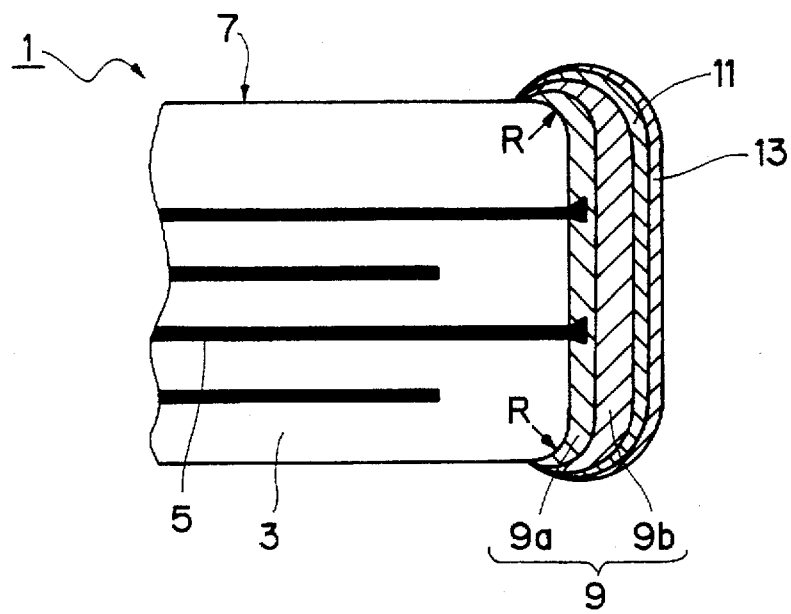
FIG. 5 is a partial fragmentary section of a multilayer ceramic chip capacitor as yet another example of the electronic component of the invention.

FIG. 5 is a partial fragmentary section of a multilayer ceramic chip capacitor as yet another example of the electronic component of the invention, in which chamfering is effected on the periphery of each of the end faces at which the internal electrodes are to be connected to the external electrode which is adapted to have a dual structure. The multilayer ceramic chip capacitor having the structure shown in FIG. 5 has very high resistance to both soldering heat impact and cyclic thermal impact.

The following example and comparative examples are provided for the purpose of further illustrating how much the multilayer ceramic chip electronic component of the present invention was improved in resistance to soldering heat impact and cyclic thermal impact but they are in no way to be taken as limiting.

EXAMPLE 1

A multilayer ceramic chip capacitor having the construction shown in FIG. 1 was fabricated by the following procedure.

(a) Chamfering the capacitor chip

The multilayer ceramic capacitor chip 7 had the ceramic dielectric member 3 made from a barium titanate-base material and the internal electrodes 5 made from an alloy having the composition $Ag_{70}Pd_{30}$. The dielectric and internal electrode layers were superposed in a total of 25 layers. The capacitor chip 7 was 2 mm long, 1.25 mm wide, and 0.6 mm thick. The chip was charged into a pot together with a mixed powder consisting of 50 wt % electrofused alumina having an average particle size of 40 mesh and 50 wt % of tungsten carbide having an average particle size of 40 mesh. The pot was then revolved at 78 rpm for 12 h at room temperature whereby the four peripheral sides of each end face where the external electrode was to be formed were chamfered to a radius of curvature (R) of 0.13 mm.

(b) Forming the external electrode

A silver (Ag) powder (91.3 wt % based on the total weight of inorganic components) having an average particle size of 3 μm and the particles of molten glass frit (8.7 wt % based on the total weight of inorganic components) that was composed of PbO/SiO/ZnO and which had an average size of 5 μm were blended with a vehicle consisting of a mixture of ethyl cellulose and terpineol (20 ml) to prepare a paste. The paste was applied to both chamfered end faces of the capacitor chip to give an as-sintered thickness of 100 μm and thereafter dried at 200° C. for 15 min at atmospheric pressure. Subsequently, the dried layer was sintered at 800° C. for 10 min to form an external electrode.

(c) Plating Ni layer

Using a neutral nickel bath, a Ni plate was deposited in a thickness of 3 μm on the surface of the external electrode by 2-h plating under the following conditions: concentration, 500 g/L; current density, 0.03 A/dm$^2$; bath temperature, 50° C. The anode was made of Ni/100.

(d) Plating solder layer

Using a neutral solder bath (Sn—Pb), a Sn—Pb plate was deposited in a thickness of 3 μm on the surface of the Ni plate by 2-h plating under the following conditions: concentration, 25 g/L; current density, 0.02 A/dm$^2$; bath temperature, 30° C. The anode was made of Sn/Pb.

COMPARATIVE EXAMPLE 1

A multilayer ceramic chip capacitor was fabricated from the same chip as used in Example 1 by repeating the procedure of said example, except that the pot was revolved at 78 rpm for 6 h such that the four peripheral sides of each end face where the external electrode was to be formed were chamfered to R=0.08 mm.

Figure 6:
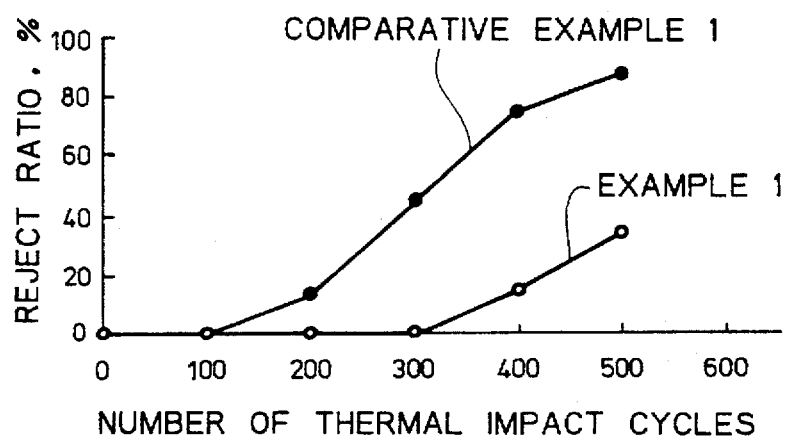
FIG. 6 is a graph showing the relationship between the number of thermal impact cycles applied to the multilayer ceramic capacitor samples fabricated in Example 1 and Comparative Example 1, and the reject ratio of those samples.

Thirty samples were provided for the capacitor of Example 1 which was chamfered to R=0.13 mm and an equal number of samples were provided for the capacitor of Comparative Example 1 which was chamfered to R=0.08 mm. The samples were subjected to a cyclic thermal impact test, with each cycle consisting of swinging between temperatures of −55° C. and 125° C. The results are shown in FIG. 6, from which one can see that when the four sides of each end face where the external electrode joined to the internal electrodes were chamfered to R=0.13 mm, the reject ratio (due to cracking) was zero percent up to 300 cycles and increased to about 20% at 400 cycles and about 40% at 500 cycles. On the other hand, the reject ratio of the control where R=0.08 mm was zero percent up to 100 cycles but increased to more than about 40% at 300 cycles and even beyond about 90% at 500 cycles.

EXAMPLE 2

A multilayer ceramic chip capacitor having the construction shown in FIG. 3 was fabricated by the following procedure.

(a) Chamfering the capacitor chip

The multilayer ceramic capacitor chip 7 had the ceramic dielectric member 3 made from a barium titanate-base material and the internal electrodes 5 made from an alloy having the composition $Ag_{70}Pd_{30}$. The dielectric and internal electrode layers were superposed in a total of 25 layers. The capacitor chip 7 was 2 mm long, 1.25 mm wide, and 0.6 mm thick. The chip was charged into a pot together with a mixed powder consisting of 50 wt % electrofused alumina having an average particle size of 40 mesh and 50 wt % of tungsten carbide having an average particle size of 40 mesh. The pot was then revolved at 78 rpm for 6 h at room temperature whereby the four peripheral sides of each end face where the external electrode was to be formed were chamfered to a radius of curvature (R) of 0.08 mm.

(b) Forming the undercoat of the external electrode

A silver (Ag) powder (60 wt % based on the total weight of inorganic components) having an average particle size of 3 μm and the particles of unmolten glass frit (40 wt % based on the total weight of inorganic components) that was composed of $PbO/SiO_2/Al_2O_3/B_2O_3/ZnO$ and which had an average size of 5 μm were blended with a vehicle consisting of a mixture of ethyl cellulose and terpineol (20 ml) to a paste for the undercoat. The paste was applied to both chamfered end faces of the capacitor chip to give an as-sintered thickness of 20 μm and thereafter dried at 200° C. for 15 min at atmospheric pressure.

(c) Forming the topcoat of the external electrode

A silver (Ag) powder (97.5 wt % based on the total weight of inorganic components) having an average size of 3 μm and the particles of unmolten glass frit (2.5 wt % based on the total weight of inorganic components) that was composed of $PbO/SiO_2/Al_2O_3/B_2O_3/ZnO$ and which had an average size of 5 μm were blended with a vehicle consisting of a mixture of ethyl cellulose and terpineol (20 ml) to prepare a paste for the topcoat. The paste was applied to both chamfered end faces of the capacitor chip in superposition on the dried undercoat to give an as-sintered thickness of 60 μm and thereafter dried at 200° C. for 15 min at atmospheric pressure.

(d) Sintering the external electrode

After drying the topcoat, the external electrode was heated to 600° C. at a rate 20° C./min and maintained at that temperature for 20 min to sinter the unmolten glass frit such that only the surfaces of the frit particles would be melted whereas their interior was maintained to remain unmolten.

(e) Plating Ni layer

Using a neutral nickel bath, a Ni plate was deposited in a thickness of 3 μm on the surface of the external electrode by 2-h plating under the following conditions: concentration, 500 g/L; current density, 0.03 A/dm$^2$; bath temperature, 50° C. The anode was made of Ni/100.

(f) Plating solder layer

Using a neutral solder bath (Sn—Pb), a Sn—Pb plate was deposited in a thickness of 3 μm on the surface of the Ni plate by 2-h plating under the following conditions: concentration, 25 g/L; current density, 0.02 A/dm$^2$; bath temperature, 30° C. The anode was made of Sn/Pb.

Figure 7:
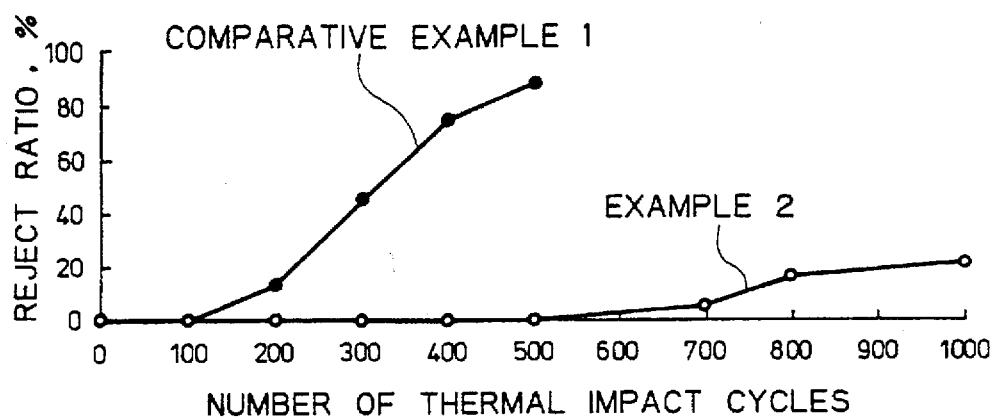
FIG. 7 is a graph showing the relationship between the number of thermal impact cycles applied to the multilayer ceramic capacitor samples fabricated in Example 2 and Comparative Example 1, and the reject ratio of those samples.

Thirty samples were provided for the capacitor that was fabricated in Example 1 and they were subjected to a cyclic thermal impact test, with each cycle consisting of swinging between −55° C. and 125° C. The results are shown in FIG. 7 together with the results of the cyclic thermal impact test conducted on the capacitor of Comparative Example 1 (see FIG. 6). Obviously, the external electrode that was adapted to have a dual structure in accordance with the present invention was effective in maintaining zero reject ratio up to 500 cycles even when it was not chamfered to R=0.1 mm or more. One can therefore understand that compared to the capacitor of Comparative Example 1 which was not chamfered to R=0.1 mm or more and which had the conventional single-layered external electrode structure, the capacitor of the invention which had a two-layered external electrode structure exhibited very high resistance to both soldering heat impact and cyclic thermal impact.

EXAMPLE 3

A multilayer ceramic chip capacitor having the construction shown in FIG. 5 was fabricated by the following procedure.

(a) Chamfering the capacitor chip

The multilayer ceramic capacitor chip 7 had the ceramic dielectric member 3 made from a barium titanate-base material and the internal electrodes 5 made from an alloy having the composition $Ag_{70}Pd_{30}$. The dielectric and internal electrode layers were superposed in a total of 25 layers. The capacitor chip 7 was 2 mm long, 1.25 mm wide, and 0.6 mm thick. The chip was charged into a pot together with a mixed powder consisting of 50 wt % electrofused alumina having an average particle size of 40 mesh and 50 wt % of tungsten carbide having an average particle size of 40 mesh. The pot was then revolved at 78 rpm for 12 h at room temperature whereby the four peripheral sides of each end face where the external electrode was to be formed were chamfered to a radius of curvature (R) of 0.13 mm.

(b) Forming the undercoat of the external electrode

A silver (Ag) powder (60 wt % based on the total weight of inorganic components) having an average particle size of 3 μm and the particles of unmolten calcined glass frit that was composed of $PbO/SiO_2/Al_2O_3/B_2O_3/ZnO$ and which had an average size of 5 μm were blended with a vehicle consisting of a mixture of ethyl cellulose and terpineol (20 ml) to prepare a paste for the undercoat. The paste was applied to both chamfered end faces of the capacitor chip to give an as-sintered thickness of 20 μm and thereafter dried at 200° C. for 15 min at atmospheric pressure.

(c) Forming the topcoat of the external electrode

A silver (Ag) powder (97.5 wt % based on the total weight of inorganic components) having an average size of 3 μm and the particles of unmolten glass frit that was composed of $PbO/SiO_2/Al_2O_3/B_2O_3/ZnO$ and which had an average size of 5 μm were blended with a vehicle consisting of a mixture of ethyl cellulose and terpineol (20 ml) to prepare a paste for the topcoat. The paste was applied to both chamfered end faces of the capacitor chip in superposition on the dried undercoat to give an as-sintered thickness of 60 μm and thereafter dried at 200° C. for 15 min at atmospheric pressure.

(d) Sintering the external electrode

After drying the topcoat, the external electrode was heated to 600° C. at a rate 20° C./min and maintained at that temperature for 20 min to sinter the unmolten glass frit such that only the surfaces of the frit particles would be melted whereas their interior was maintained to remain unmolten.

(e) Plating Ni layer

Using a neutral nickel bath, a Ni plate was deposited in a thickness of 3 μm on the surface of the external electrode by 2-h plating under the following conditions: concentration, 500 g/L; current density, 0.03 $A/dm^2$; bath temperature, 50° C. The anode was made of Ni/100.

(f) Plating solder layer

Using a neutral solder bath (Sn—Pb), a Sn—Pb plate was deposited in a thickness of 3 μm on the surface of the Ni plate by 2-h plating under the following conditions: concentration, 25 g/L; current density, 0.02 $A/dm^2$; bath temperature, 30° C. The anode was made of Sn/Pb.

Figure 8:
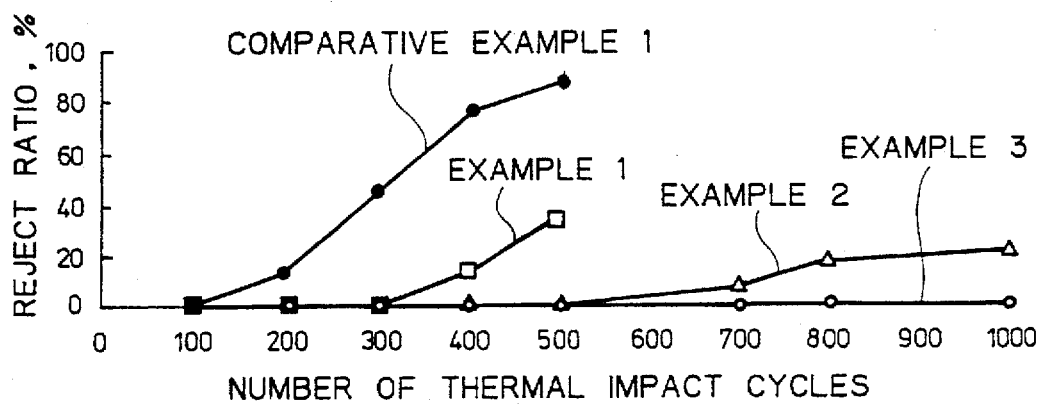
FIG. 8 is a graph showing the relationship between the number of thermal impact cycles applied to the multilayer ceramic capacitor samples fabricated in Examples 1–3 and Comparative Example 1, and the reject ratio of those samples.
Figure 9:
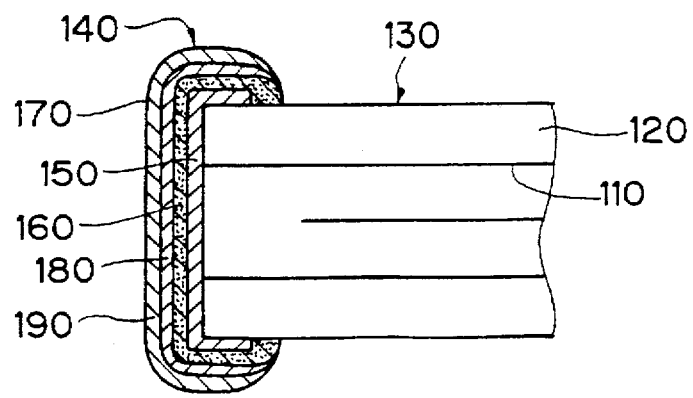
FIG. 9 is a partial fragmentary section of a conventional multilayer ceramic chip electronic component.

Thirty samples were provided for the capacitor that was fabricated in Example 3 and they were subjected to a cyclic thermal impact test, with each cycle consisting of swinging between −55° C. and 125° C. The relationship between the number of such heat cycles and the reject ratio of the samples (due to cracking) is shown in FIG. 8 together with the results of the cyclic thermal impact test conducted on the capacitors of Examples 1 and 2 and Comparative Example 1. Obviously, the samples of the capacitor fabricated in Example 3 maintained zero reject ratio even after 1,000 cycles. In contrast, the reject ratio of the samples of the capacitor fabricated in Example 1 started to increase beyond 300 cycles whereas the reject ratio of the samples of the capacitor fabricated in Example 2 exceeded 20% at 1,000 cycles. One can therefore understand from FIGS. 7 and 8 that the external electrode of Example 3 which was chamfered as in Example 1 and which also had a dual structure as in Example 2 had superior resistance to both soldering heat impact and cyclic thermal impact as compared to the case where either chamfering or the dual structure was individually adopted.

The capacitor chip for the samples of Example 3 had a thermal expansion coefficient of $1.75 \times 10^{-6}$; the values for the undercoat and topcoat of the external electrode were $1.09 \times 10^{-6}$ and $1.28 \times 10^{-5}$, respectively. Thus, the undercoat served as a cushion layer for thermal expansion and stress distribution rather than concentration occurred at the interface between the chip and the external electrode, thereby yielding products having improved resistance to thermal impacts. Given the same data on the thermal expansion coefficient ($1.75 \times 10^{-6}$ for the chip and $1.28 \times 10^{-5}$ for the external electrode), the prior art samples having a single-layered external electrode experienced thermally induced stress concentration at the interface between the capacitor chip and the external electrode, thereby yielding products having only low resistance to thermal impacts.

The multilayer ceramic chip capacitor of the present invention had the values of capacitance, loss tangent and insulation resistance that were necessary for capacitors of the type contemplated by the present invention. It also had satisfactory resistance to the heat of soldering in that it was not corroded by solder, nor did it experience cracking, spalling or deteriorated insulation resistance under the impact of the heat applied by soldering. In addition, the soldered product had very high resistance to cyclic thermal impact, thermal shock and bending stresses. The external electrode of a two-layered structure had no voids in either the undercoat or the topcoat and, hence, assured positive protection against the permeance of plating solutions and the adsorption of hydrogen. Thus, according to the invention, the undercoat of the external electrode prevents the permeance of plating solutions and hydrogen and the topcoat provides better adhesion to plated metals.

The electrode of a two-layered structure is one of the unique features of the invention and may be applied not only to capacitors but also to other multilayer ceramic chip electronic components such as chip resistors and LSI packages which are well known to the skilled artisan.

Thus, according to the invention, the periphery of each of the end faces of a chip where the internal electrodes are to be connected to the external electrode is chamfered or said external electrode is adapted to have a two-layered structure and either approach is effective in assuring superior resistance to both soldering heat impact and cyclic thermal impact. It should particularly be noted that if the external electrode of a two-layered structure is to be made from unmolten glass frit, the latter is sintered at such a temperature that only the surfaces of the frit particles are melted whereas their interior is maintained to remain unmolten. The thus sintered external electrode has a greater thermal shock absorbing capability than the conventional version which is made from molten glass frit. In addition, thermal expansion coefficient is adjusted to vary stepwise in the order of the dielectric material, the undercoat of the external electrode, the topcoat and the plated metal layers and this helps distribute the thermal stress caused by thermal expansion.

As a result, the multilayer ceramic chip electronic component of the invention is effectively protected against cracking under the impact of the heat generated at soldering temperatures, as well as against crack-induced deterioration in insulation. Even if the final product is subjected to cyclic thermal impacts consisting of exposure to high and low temperatures during service, it is effectively protected against thermally induced cracking and deteriorated insulation. Hence, the product of the invention can maintain high operational reliability over an extended period of time.

What is claimed is:

1. In a multilayer ceramic chip capacitor comprising a multilayer ceramic capacitor chip having internal electrodes, an external electrode that is formed of a sintered layer of a paste containing both an electroconductive metal powder and a glass frit on both end faces of said multilayer ceramic capacitor chip and that has electric connection to said internal electrodes, and a coating of plated metal deposited on the surface of said external electrode, said multilayer ceramic capacitor chip being chamfered to a radius of curvature (R) of 0.10 mm or more on the periphery of each of the end faces at which the internal electrodes are to be connected to the external electrode, said external electrode having a dual structure consisting of an undercoat in contact with said internal electrodes and a topcoat in superposition on the surface of said undercoat, said undercoat being formed of a paste containing unmolten glass frit in an amount from 22 to 40 wt % of the electroconductive metal powder (based on the weight of the inorganic components of said paste) and said topcoat being formed of a paste containing unmolten glass frit in an amount from more than 0 to 7 wt % of the electroconductive metal powder (based on the weight of the inorganic components of said paste), and both the topcoat and the undercoat being formed by sintering the applied pastes at temperatures that cause only the surfaces of the particles in said glass frit to melt.

2. A multilayer ceramic chip capacitor according to claim 1, wherein R is in the range from 0.13 to 0.15 mm.

3. A capacitor according to claim 1, wherein the unmolten glass frit contains at least one of PbO, $SiO_2$, $Al_2O_3$, $B_2O_3$ and ZnO.

4. A capacitor according to claim 1, wherein the as-sintered undercoat has a thickness in the range from 5 to 20 μm and the as-sintered topcoat has a thickness in the range from 20 to 100 μm, with the topcoat being thicker than the undercoat.

* * * * *